United States Patent

Ohsawa et al.

[11] Patent Number: 5,863,473
[45] Date of Patent: Jan. 26, 1999

[54] PROCESS FOR PRODUCING MAGNETIC RECORDING MEDIUM

[75] Inventors: Hiroshi Ohsawa; Daisuke Shiomi; Akira Fukizawa, all of Ichihara, Japan

[73] Assignee: Showa Denko Kabushiki Kaisha, Tokyo, Japan

[21] Appl. No.: 895,427

[22] Filed: Jul. 16, 1997

[51] Int. Cl.⁶ .............................. G11B 5/84; B29D 17/00
[52] U.S. Cl. ........................ 264/1.33; 264/1.37; 264/400
[58] Field of Search ................................. 264/1.33, 1.37, 264/2.5, 400; 369/116; 219/121.61, 121.69

[56] References Cited

U.S. PATENT DOCUMENTS

| | | |
|---|---|---|
| 3,448,458 | 6/1969 | Carlson et al. . |
| 4,709,417 | 11/1987 | Kuwabara ................................ 369/116 |
| 5,062,021 | 10/1991 | Ranjan et al. . |
| 5,084,856 | 1/1992 | Henmi et al. ............................ 369/116 |
| 5,108,781 | 4/1992 | Ranjan et al. . |
| 5,279,775 | 1/1994 | Thomas et al. ......................... 264/133 |
| 5,582,878 | 12/1996 | Ogawa et al. . |

FOREIGN PATENT DOCUMENTS

| | | |
|---|---|---|
| 0652554 | 5/1995 | European Pat. Off. . |
| 6111294 | 4/1994 | Japan . |

*Primary Examiner*—Mathieu D. Vargot
*Attorney, Agent, or Firm*—Sughrue, Mion, Zinn, Macpeak & Seas, PLLC

[57] ABSTRACT

A laser beam is focused onto a substrate for texturing the substrate surface to form a multiplicity of microscopic bumps thereon, wherein the laser beam to be focused is continuously modulated at an $I_{max}/I_{min}$ ratio in the range from 10 to 100 wherein $I_{max}$ is the maximum amplitude of pulse oscillating laser beam output and $I_{min}$ is the minimum amplitude of pulse oscillating laser beam output, while the minimum output of the laser beam is controlled to a level lower than the minimum energy required for creating the microscopic bumps. A magnetic recording medium having good CSS characteristics can be produced at a high production rate from the laser-textured substrate.

9 Claims, 2 Drawing Sheets

PROCESS FOR PRODUCING MAGNETIC RECORDING MEDIUM

BACKGROUND OF THE INVENTION (1) Field of the Invention

This invention relates to a process for producing a magnetic recording medium. More particularly, it relates to an improvement in a process for producing a magnetic recording medium including a step of texturing a substrate surface.

The magnetic recording medium made by the process of the present invention exhibits an enhanced durability against wear due to sliding contact of a magnetic hard disc (hereinafter abbreviated to "HD") with a magnetic head.

(2) Description of the Related Art

The recent progress of increasing the density of magnetic recording medium is remarkable. It has heretofore said that the rate of increase in the recording density of hard disc drives (hereinafter abbreviated to "HDD") is about 10 times per 10 years, but now it may be said that the rate of density increase is about 100 times per 10 years.

In HDD, there is adopted mainly a Winchester system, i.e., CSS (contact start-stop) system involving a basic operation of a sliding movement due to contact of HD with a magnetic head, floating of the head above the magnetic head and then a sliding movement due to contact of HD with the head. The CSS system has contributed in no small measure to the amazing progress in increase of recording density. However, this system has invited an attractive problem of tribology. More specifically, the amazing progress in increase of recording density has invited an increase of rotational speed of the disc and a reduction of a flying height of the magnetic head. Therefore, there is now an increasing demand for improving head-and-disc wear characteristics and stability in sliding movement, and for enhancing smoothness of the HD surface.

The key to the improvement of head-and-disc-wear characteristics lies in an increase of the tenacity of materials and a lowering of friction coefficient or an enhancement of lubrication. As regards HD, attempts have been made for lowering the friction coefficient by rendering rough the HD surface, and for coating the HD with a protective coating material such as diamond-like carbon (DLC) or a coating lubricating agent. The surface treatment for lowering the friction coefficient is referred to as "texturing treatment" and is intended to effectively reduce the contact area in the CSS system whereby the head-and-disc wear characteristics are improved. The texturing treatment comprises forming a multiplicity of bumps having peaks and indentations or valleys with predetermined height and depth on the textured HD surface, and now the texturing treatment is an essential step for the HD production.

The texturing treatment greatly depends upon the particular material of the disc substrate. For example, in the case of an aluminum disc blank having a nickel-phosphorus (NiP) coating, the surface roughening is generally effected by mechanical polishing using an abrasive grain. In the case of a glass substrate, an etching technique utilizing lithography or a combination of lithography with printing have been proposed and some of the proposed techniques have been practically adopted.

In the texturing treatment, there are problems inconsistent with each other, namely, it is difficult to precisely control the surface roughness with an enhanced production efficiency. For example, the mechanical abrasion has technical problems of over-abrading or burr occurrence, and blurring of textured areas, and the lithographic etching has a problem that the production steps are complicated.

In recent years a texturing treatment utilizing laser beam such as laser ablation and laser etching have attracted attention (see, for example, U.S. Pat. No. 5,062,021 and Japanese Unexamined Patent Publication (hereinafter abbreviated to "JP-A") 62-209,798, 3-272018 and 7-182655). The laser beam texturing is advantageous in that, first, the surface roughness of substrate can be precisely controlled, namely, the height, spacing and location of microscopic bumps created by laser beam focusing can be desirably controlled, and, secondly, the production steps are carried out in a dry state without use of any liquid and thus the HD production can be conducted without contamination of the working environment.

But, the laser beam texturing has problems such that, when the preset height or spacing of bumps is not adequate, the adsorption of the magnetic head onto the disc surface and the CSS characteristics are markedly deteriorated. Further, the flying stability of a glide head for inspecting unacceptable bumps on the disc surface is deteriorated and the head noise increases with the result of failure of inspecting the normal glide height.

Proposals of pulse oscillating laser texturing have been made. For example, U.S. Pat. No. 5,062,021 discloses the creation of crater-like bumps each comprised of a circular rim surrounding a pit and having a diameter of 2.5 to 100 $\mu$m and a spot spacing of 12.7 to 25.4 $\mu$m on an NiP-coated aluminum substrate by using a Q-switched pulse oscillating Nd-YAG laser with a wavelength of 1,064 nm and an oscillation frequency of 12 KHz. JP-A 7-182655 discloses the creation of bumps having a diameter of 1 to 200 $\mu$m and a spot spacing of 1 to 500 $\mu$m on a glass substrate by using a pulse oscillating $CO_2$ laser with a wavelength of 10,600 nm and an oscillation frequency of 1.5 KHz.

In the proposed pulse oscillating laser texturing treatments, when the bumps spacing between the adjacent bumps on the substrate is shortened, the number of bumps to be formed in a texturing region increases and a substantial time is required for completion of texturing operation.

Working examples of pulse oscillating laser texturing on a circular strip region having a width of 17 to 20 mm spaced from the center of a disc with a diameter of 95 mm will now be specifically described.

If a pulse oscillating Nd-YAG laser with a wavelength of 1,064 nm is used at an oscillation frequency of 12 KHz as disclosed in U.S. Pat. No. 5,062,021 to form bumps with a diameter of 25 $\mu$m and a spacing of 25 $\mu$m between the outer peripheries of rims both in the radial and peripheral directions, about 140 thousands of bumps are formed and about 11 seconds are required for completion of the laser texturing treatment. If a pulse oscillating $CO_2$ laser with a wavelength of 10,600 nm is used at an oscillation frequency of 15 KHz as disclosed in JP-A 7-182655 to form bumps of the same number, dimension and spacing as mentioned above, about 90 seconds are required for completion of the laser texturing treatment.

Further, if the above-mentioned pulse oscillating Nd-YAG laser with a wavelength of 1,064 nm is used at an oscillation frequency of 12 KHz as disclosed in U.S. Pat. No. 5,062,021 to form bumps with a diameter of 85 $\mu$m and a spacing of 8 $\mu$m between the outer peripheries of rims both in the radial and peripheral directions, about 3,500 thousands of bumps are formed and about 5 minutes are required for completion of the laser texturing treatment. If the above-mentioned pulse oscillating $CO_2$ laser with a wavelength of 10,600 nm is used at an oscillation frequency of 15 KHz as disclosed in JP-A 7-182655 to form about 3,500 thousands of bumps of the same dimension and spacing as mentioned above, about 39 minutes are required for completion of the laser texturing treatment.

JP-A 4-281030 teaches that adsorption of a magnetic head can be reduced by the formation of bumps distributed relatively densely in the peripheral direction and relatively sparsely in the radial direction. If a pulse oscillating Nd-YAG laser with a wavelength of 1,064 nm is used at an oscillation frequency of 12 KHz as disclosed in U.S. Pat. No. 5,062,021 to form bumps with a diameter of 2 $\mu$m and a spacing of 8 $\mu$m and 18 $\mu$m between the outer peripheries of rims in the radial and peripheral directions, respectively, as described in a working example of JP-A 4-281030, then about 1,700 thousands of bumps are formed and about 2.5 minutes are required for completion of the laser texturing treatment. If a pulse oscillating $CO_2$ laser with a wavelength of 10,600 nm is used at an oscillation frequency of 15 KHz as disclosed in JP-A 7-182655 to form bumps of the same number, dimension and spacing as mentioned above, about 19.5 minutes are required for completion of the laser texturing treatment.

The frequency of repeated oscillation of pulse oscillation lasers is not on a high level. For example, it is at most about 20 KHz in the case of commercially available switched Nd-YAG lasers. With a frequency of repeated oscillation exeeding this level, the stability of laser output is lowered and the pulse oscillation lasers are not suitable for the laser texturing treatment.

As seen from the above-cited references, the shortening of spacings between the adjacent bumps formed on a substrate surface invites a definite reduction of workability of a laser texturing apparatus used in a step of producing a magnetic recording disc. In other words, as far as a pulse oscillating laser is used, the bump spacings cannot be reduced to a distance shorter than a certain distance without reduction of workability of the laser texturing apparatus. Thus the design of bumps to be formed on a substrate by the laser texturing is limited in view of the CSS characteristics.

As regards the height of bumps created by focusing a pulse oscillating laser beam on a substrate, said height varies depending upon the particular laser output. The height of bumps created by a laser texturing treatment is usually in the range of 10 to 50 nm, and the laser beam energy applied employed for forming bumps, for example, on a nickel-phosphorus (NiP) plated aluminum substrate is usually in the range of 1 to 10 J/spot (see IEEE, Transactions on Magnetics, vol. 31, No. 6, p2946). It is also described that a laser beam with an output of a level lower than the minimum energy for generating laser ablation is focused on a substrate such as glass or ceramic to form microscopic bumps thereon (JP-A 7-182655 and JP-A 7-156723). In these laser texturing treatments, the peak energy of pulse oscillating laser is utilized, and thus, the laser output is lowered by an attenuator.

The laser beam energy required for a laser texturing treatment is much lower than that employed for laser beam machining, and the height of microscopic bumps varies greatly depending upon the particular fluctuation of pulse oscillating laser output. When the laser beam energy is very small, microscopic bumps are occasionally not created. Therefore a laser texturing treatment by which bumps of a desired dimension can be formed by pulse oscillating laser beam even without attenuation of the peak energy or even where the laser beam is continuous wave laser.

SUMMARY OF THE INVENTION

In view of the foregoing, a primary object of the present invention is to provide a process for producing a magnetic recording medium including a step of laser-texturing a substrate surface to form a multiplicity of microscopic bumps, whereby the laser texturing of the substrate can be conducted at a high rate and microscopic bumps of desired diameter, height and spacing can be formed on the substrate surface, and thus, the design of laser texturing can easily be made and a magnetic recording medium having good CSS characteristics can be produced with an enhanced productivity.

In accordance with the present invention, there is provided an improvement in a process for producing a magnetic recording medium including a step of focusing a laser beam for texturing a substrate surface to form a multiplicity of microscopic bumps on the substrate surface. The improvement lies in that the laser beam to be focused is continuously modulated at an $I_{max}/I_{min}$ ratio in the range from 10 to 100 wherein $I_{max}$ is the maximum amplitude of pulse oscillating laser beam output and $I_{min}$ is the minimum amplitude of pulse oscillating laser beam output, while the minimum output of the laser beam is controlled to a level lower than the minimum energy required for creating the microscopic bumps.

Preferably, the continuous modulation of the laser beam is conducted by using an acoustic-optic (hereinafter abbreviated to "A/O") device or an electro-optic (hereinafter abbreviated to "E/O") device as an external modulator.

The laser beam is preferably a continuous wave (CW) laser of visible radiation, especially with a wavelength of 400 to 600 nm.

Preferably the modulated laser beam is focused into a spot with a diameter of 1 to 10 $\mu$m on the substrate surface in a manner such that microscopic bumps are formed in series at a predetermined constant spacing between the adjacent bumps and are distributed in a strip region on the substrate surface. The thus-formed bumps preferably have a diameter of 1 to 10 $\mu$m, a height of 1 to 30 $\mu$m, and a spacing of 1 to 50 $\mu$m between the outer peripheries of the adjacent bumps, and occupy 0.1 to 99.9% of the entire area of the substrate surface.

Preferably, the modulated laser beam is focused onto a disc as the substrate while the disc is rotated at a continuously varied rate and is moved in the radial direction thereof; or the modulated laser beam is reflected by a mirror moving so that a continuously varied reflected angle is produced, and the reflected laser beam is focused onto a stationary disc as the substrate. The modulated laser beam to be focused may be divided into 2 to 10 parallel beams.

DESCRIPTION OF THE PREFERRED EMBODIMENTS

Figure 1:
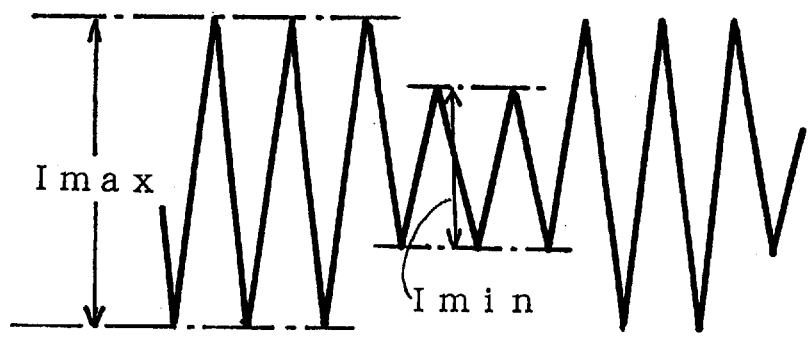
FIG. 1 is an explanatory view illustrating the maximum amplitude ($I_{max}$)/minimum amplitude ($I_{min}$) ratio of a continuously modulating pulse oscillation laser beam.

In the process for producing a magnetic recording medium, a laser beam is focused on a substrate surface for texturing the substrate while the laser beam focused is continuously modulated within a specific $I_{max}/I_{min}$ ratio range, wherein $I_{max}$ and $I_{min}$ are the maximum amplitude and the minimum amplitude, respectively, of the continuously modulated continuous wave laser beam output as illustrated in FIG. 1. The continous modulation of the laser beam is carried out in a manner such that the minimum output of the laser beam is controlled to a level lower than the minimum energy required for creating the microscopic bumps, namely, in a manner such that the laser beam output of a level higher than the minimum energy required for creating microscopic bumps and that of a level lower than the minimum energy are alternately developed.

The continuous modulation of the laser beam is effected by utilizing an A/O device or an E/O device. An A/O device has a function of continuously varying a rectilinearly propagated laser beam due to the fact that, when an optical crystal is irradiated with an ultrasonic wave, the diffraction angle of continuously oscillating laser beam is varied by the photoelastic effect of an optical crystal. An E/O device has a function of continuously varying the laser beam due to the fact that, when a voltage is imposed to an optical crystal, the optical path of incident laser beam is varied by the electric-optic effect of the optical crystal. Both A/O device and E/O device enable to modulate the laser beam output at a frequency of the order of MHz by the ultrasonic wave or the electric pulse, and the degree of modulation of the laser beam output can easily be freely varied.

The laser beam, the output of which has been modulated by an external modulator utilizing an A/O or E/O device, is focused through a lens on a substrate surface at a target spot diameter of 1 to 10 μm. To effectively utilize the energy of laser beam for the formation of microscopic bumps, it is required to provide a focus depth located at a certain distance from the substrate surface. The energy of laser beam required for creation of microscopic bumps is usually about 1 to about 10 μJ/pulse as mentioned above, and thus, the output stability of laser influences fluctuation of the height of bumps. The focus depth varies depending upon the particular laser wavelength, and therefore, infrared laser such as YAG laser and $CO_2$ laser is not suitable for provide a desired focus length. Ultraviolet laser such as excimer laser or the fourth higher harmonic of YAG laser is suitable for obtaining a desired focus depth, but is not advantageous in that the output stability of laser is poor and fluctuation of the height of bumps is large, and thus, it is applicable only to a glass or another limited substrate which is capable of absorbing ultraviolet laser as described in JP-A 7-176929.

Thus, a continuous wave (CW) laser which is visible radiation, preferably with a wavelength of 400 to 600 nm, is advantageously used in the present invention in view of the expediency for forming the desired focus depth, and the enhanced output stability of laser beam.

The laser beam is focused onto the substrate surface so as to form a multiplicity of microscopic bumps which are distributed in series at a predetermined constant spacing in an annular band as head contact area on the substrate surface.

Figure 2:
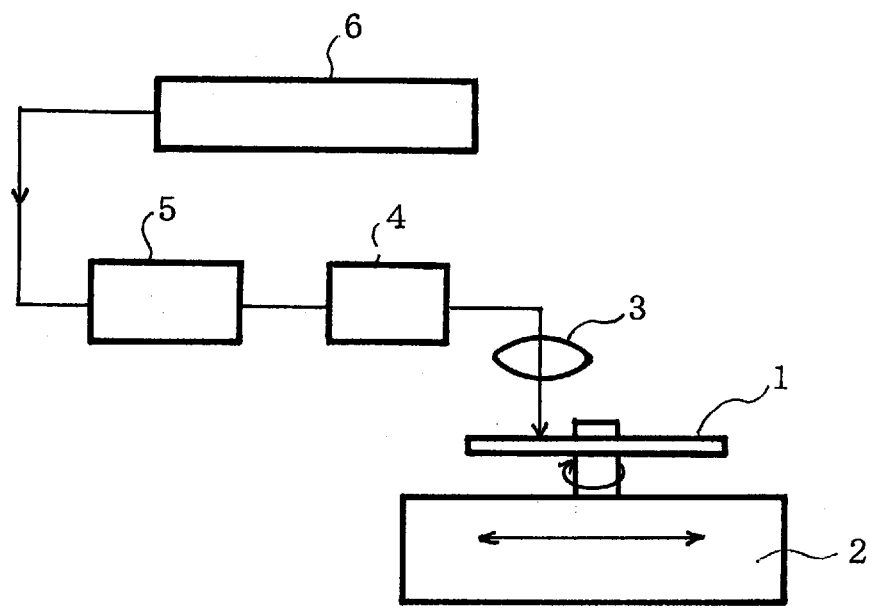
FIG. 2 is a schematic diagram showing an optical system and a working stage in a laser texturing apparatus used in Example 1 explained below.

In one method of forming the bumps in the annular head contact area, the laser beam is focused on the substrate surface while the substrate is rotated at a continuously varied rate and is transferred in the radial direction thereof. More specifically, as illustrated in FIG. 2, a continuously generated laser pulse 6 is modulated by an A/O device 5 and then attenuated by an attenuator 4. The attenuated laser pulse is focused through an optical lens 3 onto a substrate 1 mounted on a rotating spindle which continuously moves linearly in a radial direction of the disc substrate (as shown by an arrow) on a working stage 2.

Figure 4:
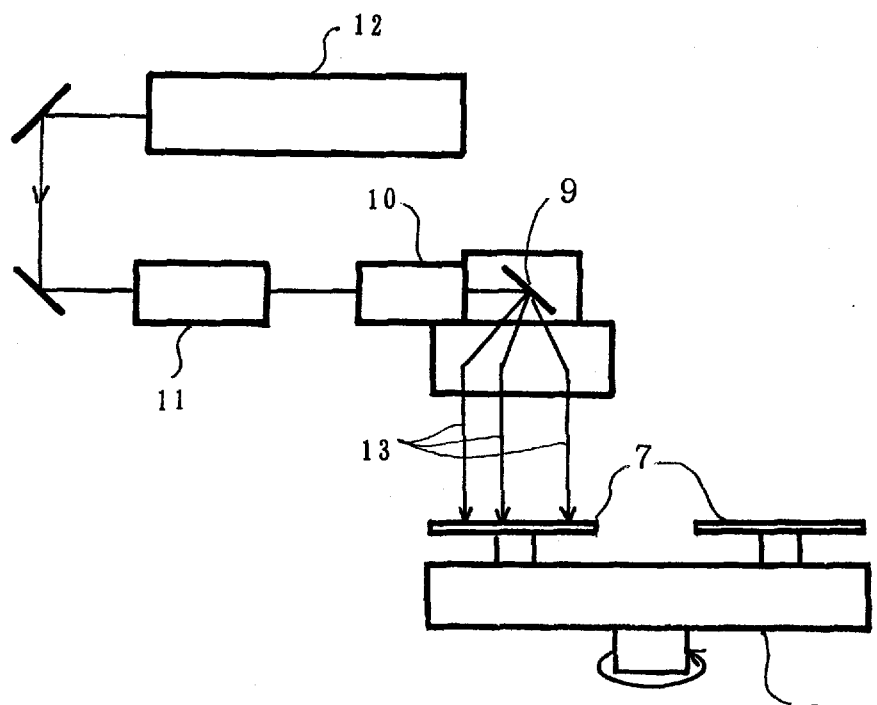
FIG. 4 is a schematic diagram showing an optical system and a working stage in a laser texturing apparatus used in Example 2 explained below.

In another method of forming the bumps in the annular head contact area, the laser beam is reflected by a moving mirror at a continuously varied reflection angle, and the reflected laser beam is focused on a stationary substrate. More specifically, as illustrated in FIG. 4, a continuously generated laser pulse 12 is modulated by an E/O device 11 and then attenuated by an attenuator 10. The attenuated laser beam is reflected by a galvanomirror 9 which rotates so that a continuously varied reflection angle is obtained, and the reflected laser beam is focused on a stationary substrate 7 mounted on a working station 8.

The laser beam may be divided into a plurality of parallel beams which are then focused through lenses onto a substrate, whereby the texuring time can be further shortened. The number of divided laser beams is usually in the range of 2 to 10. As means for dividing the laser beam into a plurality of parallel beams, there can be mentioned means using a diffraction grating and means using multiple half-mirrors.

In view of the magnetic recording properties of the resulting disc, the microscopic bumps formed on the substrate surface preferably have a diameter of 1 to 10 μm, a height of 1 to 30 μm, and a spacing of 1 to 50 μm between the outer peripheries of adjacent bumps. The areal percent of microscopic bumps is not particularly limited, and the bumps may occupy 0.1 to 99.9% of the entire area of the substrate surface.

The substrate for a magnetic recording medium to be textured in the process of the present invention is not particularly limited provided that it is capable of being textured with a laser which is visible radiation, especially with a wavelength of 400 to 600 nm. As specific examples of the substrate, there can be mentioned a disc blank made of aluminum or an aluminum alloy such as an aluminum magnesium alloy, which has been plated with nickel-phosphorus (NiP), nickel-copper (NiCu) or cobalt-phosphorus (CoP), or which has been subjected to anodic oxidation; and a disc blank made of silicon or glass.

The surface-textured substrate may be washed with a solvent. On the surface-textured substrate, an undercoat such as a chromium layer, a magnetic coating, e.g., a CoCrTa alloy layer, a protective coating such as a carbon layer and a lubricating coating are usually formed in this order. Usually the magnetic coating-formed or lubricating coating-formed substrate is subjected to tape-burnishing to remove surface protrusions. The procedures, conditions and materials employed for forming these coatings are not particularly limited, and may be conventional.

The laser texturing treatment of the present invention can be applied to not only a substrate on which a magnetic coating has not been formed yet, but also a disc having a magnetic coating formed thereon or a disc having a protective coating further formed thereon.

The present invention will now be described by the following examples that by no means limit the scope of the claims of the invention.

LASER TEXTURING TREATMENT

EXAMPLE 1

A laser texturing apparatus having an optical system and a working stage as schematically illustrated in FIG. 2 was used.

As a continuous wave (CW) laser source, a continuous wave argon laser having an output of 2 W, a single wave mode with a wavelength of 515 nm and a laser beam diameter of 0.3 mm was used. As a laser beam output modulator, an A/O device made of quartz and having a maximum signal conversion of 80% and a rise time of 50 nsec. A digital driver and a pulse generator were connected to the A/O device to constitute a high-speed optical modulating system.

A laser beam was focused by a condenser lens to a diameter of 0.3 mm and was then incident upon the optical modulation system. A rectangular pulse with a frequency of 1 MHz generated by the pulse generator was introduced into the A/O device to give a modulated laser beam having a rise time of 50 nsec, a maximum pulse duration of 150 nsec, an $I_{max}/I_{min}$ ratio of 80 and a repetition modulation frequency of 1 MHz.

The modulated laser beam was focused through a lens into a spot diameter of 3 μm on an NiP-plated aluminum disc blank with a diameter of 95 mm, rotating at 2,000 rpm and moving in a radial direction at a rate of 1 mm/sec.

Thus microscopic bumps having a diameter of 3 μm, a height of 25 nm, a peripheral spacing of 5 μm between the outer edges and a radial spacing of 20 μm between the outer edges were formed on an annular band with a width of 17 to 20 mm. The number of bumps was about 1,900,000 per disc and the working time required for texturing was about 2 seconds. The texturing rate was 600 discs per hour.

Figure 3:
FIG. 3 is an enlarged cross-sectional view of microscopic bumps formed by the process of the present invention.

An enlarged cross-sectional view of the microscopic bumps obtained in this example is illustrated in FIG. 3.

In the laser texturing apparatus used, the revolution number of the substrate and the moving rate thereof in the radial direction were varied at a predetermined rate by a servomotor-controlling signal from a computer so as to form the bumps in series at a predetermined constant spacing. The laser, the optical lenses, the A/O device and the working stage were mounted on a vibration isolating bed so as to prevent or minimize the fluctuation of the laser texturing interval due to external vibration.

EXAMPLE 2

The texturing procedure employed in Example 1 were repeated wherein an E/O device was used instead of the A/O device, and a laser texturing apparatus having an optical system and a working stage as schematically illustrated in FIG. 4 was used. Thus, a modulated laser beam having a rise time of 50 nsec, a maximum pulse duration of 150 nsec, an $I_{max}/I_{min}$ ratio of 80 and a repetition modulation frequency of 500 KHz was obtained.

The modulated laser beam was focused through a galvanomirror exhibiting a reflection angle continuously varied in both X and Y directions and further through lenses into a spot diameter of 5 μm on a stationary NiP-plated aluminum disc blank with a diameter of 95 mm mounted on the working stage. Thus microscopic bumps having a diameter of 5 82 m, a height of 25 nm, a peripheral spacing of 5 μm between the outer edges and a radial spacing of 20 μm between the outer edges were formed on an annular band with a width of 17 to 20 mm. The number of bumps was about 1,400,000 and the working time required for texturing was about 3 seconds. The texturing rate was 800 discs per hour.

EXAMPLE 3

The modulated laser beam obtained in Example 1, which had a rise time of 50 nsec, a maximum pulse duration of 150 nsec, an $I_{max}/I_{min}$ ratio of 80 and a repetition modulation frequency of 1 MHz, was focused through a galvanomirror exhibiting a reflection angle continuously varied in the radial direction of the disc and further through a lens into a spot diameter of 5 μm on an NiP-plated aluminum disc blank with a diameter of 95 mm rotating at a rate of 2,000 rpm.

Thus microscopic bumps having a diameter of 3 μm, a height of 25 nm, a peripheral spacing of 5 μm between the outer edges and a radial spacing of 20 μm between the outer edges were formed on an annular band with a width of 17 to 20 mm. The working time required for texturing was about 2 seconds. The texturing rate was 700 discs per hour.

The revolution number of the substrate and the moving rate thereof in the radial direction were varied at a predetermined rate by a servomotor-controlling signal from a computer so as to form the bumps in series at a predetermined constant spacing.

EXAMPLE 4

The modulated laser beam obtained in Example 1, which had a rise time of 50 nsec, a maximum pulse duration of 150 nsec, an $I_{max}/I_{min}$ ratio of 80 and a repetition modulation frequency of 1 MHz, was radially separated into two beams through a lens and a diffraction grating, the two beams were focused into a spot each having a diameter of 5 μm on an NiP-plated aluminum disc blank with a diameter of 95 mm rotating at a rate of 2,000 rpm and moving at a rate of 1 mm/min in the radial direction.

Thus microscopic bumps having a diameter of 5 μm, a height of 25 nm, a peripheral spacing of 5 μm between the outer edges and a radial spacing of 20 μm between the outer edges were formed on an annular band with a width of 17 to 23 mm. The working time required for texturing was about 3 seconds. The texturing rate was 600 discs per hour.

The revolution number of the substrate and the moving rate thereof in the radial direction were varied at a predetermined rate by a servomotor-controlling signal from a computer so as to form the bumps in series at a predetermined constant spacing.

EXAMPLE 5

The texturing procedure mentioned in Example 1 were repeated wherein a continuous wave YAG laser excited with a semiconductor laser and having a double wave mode with a wavelength of 532 nm and an output of 3 W was used instead of the single wavelength mode with a wavelength of 515 nm with all other apparatuses, procedures and conditions remaining substantially the same. The working time required for texturing and the texturing rate were the same as those obtained in Example 1.

Comparative Example 1

As a continuous wave (CW) laser source, a pulse-oscillating Nd-YAG laser having an oscillation frequency of 20 KHz, a double wave mode with a wavelength of 532 nm and a output of 5 W was used. A laser beam was focused through a galvanomirror exhibiting a reflection angle continuously varied in both X and Y directions by a servomotor-controlling signal from a computer, and further through a lens onto a spot diameter of 5 μm on a stationary NiP-plated aluminum disc blank with a diameter of 95 mm mounted on the working stage.

Thus microscopic bumps having a diameter of 5 μm, a height of 25 nm, a peripheral spacing of 5 μm between the outer edges and a radial spacing of 20 μm between the outer edges were formed on an annular band with a width of 17 to 20 mm. The number of bumps was about 1,400,000 and the working time required for texturing was about 1 minute and 10 seconds. The texturing rate was 50 discs per hour.

Preparation of Magnetic Recording Medium

On each of the laser-textured substrates obtained in Examples 1 to 5 and Comparative Example 1, a chromium undercoat having a thickness of 100 nm, a CoCrTa alloy magnetic coating having a thickness of 20 nm, and then, a carbon protective coating having a thickness of 20 nm were formed in this order at a substrate temperature of 200° C. by sputtering. Finally, a perfluoro-polyether (PFPE) lubricating agent coated thereon to give a magnetic recording medium.

The magnetic recording media exhibited improved CSS characteristics. The stiction values (grams-force) as measured after 10,000 cycles of CSS were as follows.

| | |
|---|---|
| Example 1 | 0.43 |
| Example 2 | 0.52 |
| Example 3 | 0.44 |
| Example 4 | 0.55 |
| Example 5 | 0.41 |
| Com. Ex. 1 | 0.63 |

Thus, magnetic recording media having good CSS characteristics can be produced at a high rate, i.e., a high productivity by the process of the present invention.

The advantages of the process of the present invention are summarized as follows.

The laser texturing treatment can be conducted at a rate much higher than those conventionally employed for laser texturing, and microscopic bumps having desired diameter, height and spacing can be formed on the substrate surface. Therefore the design of laser texturing conditions can easily be made and a magnetic recording medium having good CSS characteristics can be produced with an enhanced productivity. This is in contrast with the conventional laser texturing processes employing pulse oscillation laser with acceptable maximum oscillation frequency of 20 KHz, by which microscopic bumps having desired small diameter, height and spacing cannot be formed within a practically acceptable short texturing time.

The magnetic recording medium having good CSS characteristics can be produced stably and in a large scale, and therefore, the level of defectiveness and the cost of production are reduced. When the laser beam is divided into 2 to 10 parallel beams and the divided beams are focused on the substrate surface, the working time for laser texturing can be further shortened. When a continuous wave (CW) laser of visible radiation, especially with a wave-length of 400 to 600 nm, is used, the texturing treatment can be more stably conducted.

What is claimed is:

1. An improvement in a process for producing a magnetic recording medium including a step of focusing a laser beam for texturing a substrate surface to form a multiplicity of microscopic bumps having a diameter of 1 to 10 $\mu$m. a height of 1 to 30 $\mu$m, and a spacing of 50 $\mu$m between the outer peripheries of the adjacent bumps on the substrate surface, said improvement comprising focusing a laser beam which is continuously modulated at an $I_{max}/I_{min}$ ratio in the range from 10 to 100 wherein $I_{max}$ is the maximum amplitude of pulse oscillating laser beam output and $I_{min}$ is the minimum amplitude of pulse oscillating laser beam output, while the minimum output of the laser beam is controlled to a level lower than the minimum energy required for creating the microscopic bumps.

2. The improved process according to claim 1 wherein the continuous modulation of the laser beam is conducted by using an acoustic-optic device or an electro-optic device as an external modulator.

3. The improved process according to claim 1 wherein the laser beam is a continuous wave laser of visible radiation.

4. The improved process according to claim 3 wherein the continuous wave laser has a wavelength of 400 to 600 nm.

5. The improved process according to claim 1 wherein the modulated laser beam is focused into a spot with a diameter of 1 to 10 $\mu$m on the substrate surface, and the microscopic bumps are formed in series at a predetermined constant spacing between the adjacent bumps so that the bumps are distributed in a strip region on the substrate surface.

6. The improved process according to claim 5, wherein said microscopic bumps occupy 0.1 to 99.9% of the entire area of the substrate surface.

7. The improved process according to claim 1 wherein the modulated laser beam is focused onto a disc as the substrate while the disc is rotated at a continuously varied rate and is moved in the radial direction thereof.

8. The improved process according to claim 1 wherein the modulated laser beam is reflected by a mirror moving so that a continuously varied reflection angle is produced, and the reflected laser beam is focused onto a disc as the substrate.

9. The improved process according to claim 1 wherein the modulated laser beam is divided into 2 to 10 parallel beams which are then focused through lenses onto the substrate surface.

* * * * *

UNITED STATES PATENT AND TRADEMARK OFFICE
CERTIFICATE OF CORRECTION

PATENT NO. : 5,863,473
DATED : January 26, 1999
INVENTOR(S) : Ohsawa et al.

It is certified that error appears in the above-indentified patent and that said Letters Patent is hereby corrected as shown below:

Col. 4, line 38: delete "height of 1 to 30 µm" and substitute therefor -- height of 1 to 30 nm --.

Col. 6, line 26: delete "height of 1 to 30 µm" and substitute therefor -- height of 1 to 30 nm --.

Col. 10, lines 8-9: delete "height of 1 to 30 µm" and substitute therefor -- height of 1 to 30 nm --.

Col. 10, line 9: delete "spacing of 50 µm" and substitute therefor -- spacing of 1 to 50 µm --.

Signed and Sealed this

Twenty-third Day of November, 1999

Attest:

Q. TODD DICKINSON

*Attesting Officer*        *Acting Commissioner of Patents and Trademarks*